US006973602B1

(12) United States Patent
Fung et al.

(10) Patent No.: US 6,973,602 B1
(45) Date of Patent: Dec. 6, 2005

(54) LINK AND PATH-LEVEL ERROR PERFORMANCE MONITORING

(75) Inventors: Eddie Fung, Englishtown, NJ (US); Larry Nociolo, Fair Haven, NJ (US); Martin Nuss, Fair Haven, NJ (US); Jon Peticolas, Freehold, NJ (US); Steve Surek, Leonardo, NJ (US); Ted Woodward, Holmdel, NJ (US)

(73) Assignee: CIENA Corporation, Linthicum, MD (US)

( * ) Notice: Subject to any disclaimer, the term of this patent is extended or adjusted under 35 U.S.C. 154(b) by 455 days.

(21) Appl. No.: 10/235,681

(22) Filed: Sep. 5, 2002

(51) Int. Cl.[7] .............................................. G06F 11/00
(52) U.S. Cl. ....................... 714/704; 714/746; 714/747
(58) Field of Search ................................ 714/704, 746, 714/747; 370/241, 242

(56) References Cited

U.S. PATENT DOCUMENTS 5,714,952 A * 2/1998 Wada .......................... 341/94
5,793,432 A * 8/1998 Mishima et al. ....... 375/240.01
5,986,593 A * 11/1999 Kawahara et al. ............ 341/94
2004/0030968 A1* 2/2004 Fan et al. .................. 714/704

* cited by examiner

*Primary Examiner*—Phung My Chung
(74) *Attorney, Agent, or Firm*—Merek, Blackmon and Voorhees, LLC

(57) ABSTRACT

Both link-level and path-level performance monitoring is obtained in any point of a multi-link network where transmitting points in the network are adapted to transmit codes only from a subset of the codes that receiving points in the network are adapted to receive, with one of the codes that transmitting points are adapted to transmit being chosen to represent an error-reporting code, and substituting, at monitoring points, any received code that is not one of the codes in the subset with the error-reporting code. By measuring the number of received codes that are in error, a link-level error measure is obtained, and by measuring the number of error-reporting codes, a path-level measure is obtained.

37 Claims, 1 Drawing Sheet

LINK AND PATH-LEVEL ERROR PERFORMANCE MONITORING

BACKGROUND OF THE INVENTION

This invention relates to link-to-link and end-to-end transmission error monitoring and, more particularly, to such error monitoring in systems that employ coded data communication protocols.

SONET systems provide both link-level and path-level performance monitoring through use of a special framing technique in which data is inserted into multiple conceptual 'containers'. There are 'path'-level containers that are only 'opened' at the ends of a path, and there are 'section'-level containers that are opened at each 'section'. Error calculations are made independently at path and section level. Error correction is not provided. ATM transmission also contains certain capabilities for error checking that are built-into the overhead bytes of cells of the ATM system.

As data transmission employing Ethernet over extended distances becomes more prevalent, and such transmission is effected through paths composed of multiple links, it becomes more and more desirable to have both link-level and path-level performance monitoring at any selected point. Such monitoring permits one to locally trouble shoot paths where some links are remote and, perhaps, belong to a different entity. Unfortunately, Ethernet equipment does not provide for the desirable bit error rate (BER) monitoring on a link-by-link and end-to-end (path) basis.

SUMMARY OF THE INVENTION

An advance in the art is realized in systems that employ a coding schema that employs less than the full capacity of the code for communicating information, by providing a mechanism for both link-level and path-level performance monitoring at any point of a multi-link path. Specifically, in accord with the principles of this invention, communication of information is carried out through an arrangement wherein one of the codes that is not used for communicating information is employed as a special code (Error-Reporting code, or ER code), and that code is substituted for receptions that contain an error.

Illustratively, the principles of this invention are employed in a block coding arrangement, where equipment at each ingress port of each node in the multi-node network determines the number of link errors in the received signal by evaluating the incoming signal relative to the valid codes, and counting the number of data blocks that contain other than valid codes. Concurrently, the equipment replaces each such block with an ER code. The link error corresponds to the number of errors introduced by a link immediately preceding the equipment of a node, and which are replaced with ER codes. The path error, which corresponds to the number of path errors, is indicated by the sum of the ER codes that the node replaces for blocks that contain an error, plus the number of the received ER codes.

DETAILED DESCRIPTION

The disclosed approach operates in a system with a coding schema that inherently supports a given set of available codes, but where the system employs only a subset of the available codes in the schema for communicating valid data. See, for example, Sklar, Digital Communications, 1988, ISBN 0-13-211939-0. For ease of reference, the codes within the subset are termed PUGS codes (because they are members of a Partially Used Coded Space), and the coding schema codes that are outside the subset are termed non-PUGS codes. When a receiver receives a code that is a non-PUGS code, the conclusion is reached that a transmission error occurred in the transmission of the code. Similarly, when a block of codes that contains a code that is a non-PUGS code, the conclusion is reached that a transmission error occurred in the transmission of the block. Of course, it is possible for an error to occur whereby one PUGS code is transmitted, and another PUGS code is received. Such an error cannot be detected when the error detection scheme looks only at the individual codes that are received. That suggests that the PUGS codes, each of which containing a number of bits, should be selected to have as large a Hamming distance as possible.

All systems that employ error detection are systems wherein the transmitter employs only PUGS codes, whereas the receiver detects all of the coding schema codes. This concept encompasses all coding schemas, including, for example, block coding schemas, convolutional coding schemas, etc.

In accord with the principles disclosed herein, network arrangements are enhanced by employing a selected non-PUGS code for error reporting (ER code), and allowing a transmitter to transmit the ER code. As shown below, this enhancement enables the system to provide information about both link errors and path errors. Stated in other words, in accord with the principles of this invention a network that employs a set of PUGS codes is enhanced by adding one additional code to the PUGS code set, that being the ER code.

To define formally, a link is the communication conduit that connects one node to another node, and a path comprises a plurality of links that form a conduit from any one selected node of the network to another selected node of the network.

Figure 1:
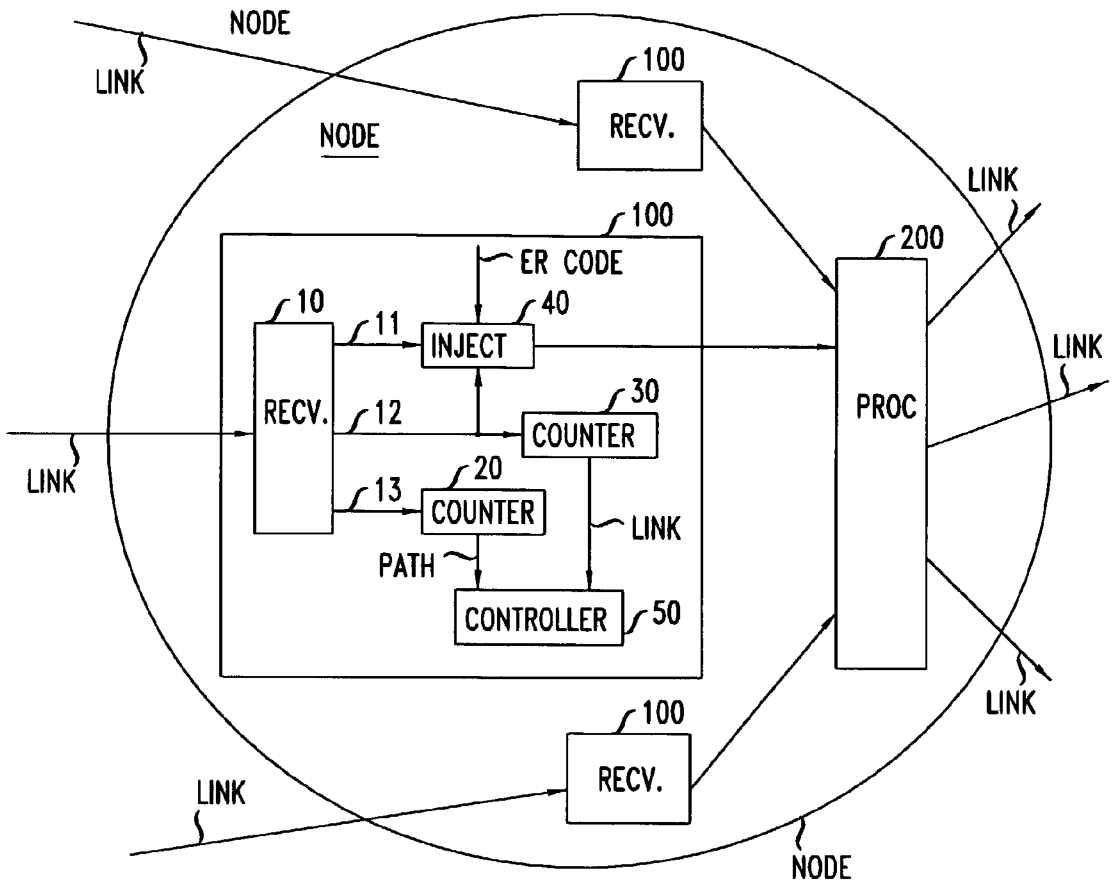
FIG. 1 presents a block diagram of an error monitoring module within a network node.

FIG. 1 presents a block diagram of a network node that provides the desired error reporting capability by including an error-monitoring module 100 at each ingress port of the node that is coupled to an inbound link. Module 100 comprises a minimally modified conventional receiver element 10 that determines which of the coding schema has been received and, consequently, whether a PUGS code, an ER code, or some other non-PUGS code was received. It is minimally modified, illustratively, to provide output line 11 that outputs the detected superset codes, output line 12 that outputs a pulse every time a communication error is detected (that is, when the output of line 11 corresponds to neither a PUGS code nor the ER code), and output line 13 that outputs a pulse every time the output of line 11 corresponds to the ER code. Line 13 is connected to conventional up-counter 20, line 12 is connected to conventional up-counter 30, and line 11 is coupled to selector 40. Thus, counter 20 counts the number of received ER codes and provides an indication of the path errors up to but not including the last link, and counter 30 counts the number of errors introduced by the last link. Selector 40 either passes to its output the codes detected by receiver 10 or, the ER code. The ER code is selected whenever control line 23 indicates that a communication error has been detected. The output signal of selector 40 is forwarded to subsequent (conventional) node elements that, in FIG. 1, are coalesced into element 200. Element 200 is coupled to other incoming links of the node, through other modules 100, and to outgoing links.

Controller 50 is coupled to counters 20 and 30. At a specified rate, for example, every 15 minutes, controller 50 reads the count of counters 20 and 30 and resets the counters. The information that is thus captured is maintained in a memory that is associated with controller 50 (not shown). In addition to keeping a record of link and path errors at the preselected time intervals, controller 50 may also keep more aggregate information, for example, daily records that correspond to the sum of the error counts within a day. Controller 50, which advantageously is a stored-program controller, is adapted to be polled by users, other nodes, or network administrators, to output the error counts that are stored in the controller's memory. Controller 50 also includes a module for analyzing the stored counts, and for outputting an alarm signal when a preselected error condition is detected by the analyzing module (e.g., when a threshold that is exceeded). Alternatively, the controller outputs a directive signal, instructing some other component, or components, to take action.

In some embodiments, controller 50 maintains a number of error-reporting "buckets." For example, a quarter-hourly bucket, an hourly bucket, and a daily bucket that can be polled individually.

To illustrate a commercial embodiment, gigabit Ethernet carries a physical line coding known as 8b/10b code. A description of this code may be found in A. X. Widmer, P. A. Franaszek, "A dc-balanced, partitioned-block 8b/10b transmission code," *IBM J. Res. Dev.* V.27(5), 1983 pp. 440–451. Given sufficient data processing capability, a receiver can determine whether any invalid 8b/10b code has been detected. Invalid 8b/10b/codes can be assumed to arise from link transmission errors. In such a link, the above-described concept of "valid code" refers to the fundamental "word" or "byte" level of the 8b/10b code, which is a 10-bit sequence. Correlations required of sequential bytes of the code can be employed to further determine errored blocks, as described in the cited reference. Any technique suitable for isolation of error is appropriate.

In addition to providing a specific set of valid transmission codes (PUGS codes), the gigabit Ethernet standard for 8b/10b coding (standard IEEE 802.3-2000) provides special codes that are not permitted to arise anywhere in the transmission of valid data (non-PUGS codes). One of these codes (the '/V/' code) is specified in the standard for 'invalid' code detection. By choosing the '/V/' code to be the ER code disclosed above, means are provided to provide error reporting, fault isolation, and end-to-end path performance measurement.

Figure 2:
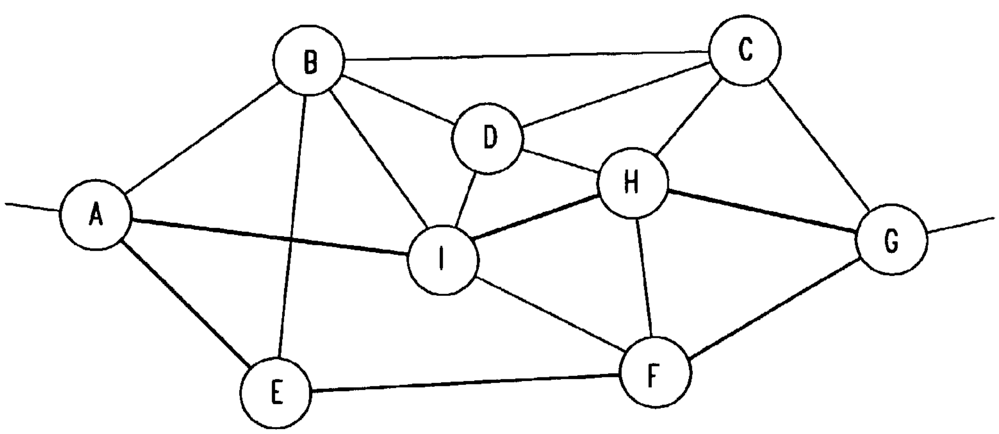
FIG. 2 illustrates a network with a primary and a secondary path that benefits from the principles of this invention.

FIG. 2 presents a block diagram of a network where the principles disclosed herein are used to an advantage. For illustrative purposes it is assumed that communication is desired from node A to node G, and that it is further desired that an alternate path should be used if the primary path between nodes A and G suffers from an error rate that is deemed too high. Thus, illustratively, the primary path in FIG. 2 consists of links A–I (link that connects lone A to node I), I–H, and H–G, and the alternate path consists of links A–E, E–F, and F–G.

For sake of simplicity, it is assumed that the same links that are used for the primary/secondary path from node A to node G are used for the primary/secondary path from node G to node A. In accordance with the principles disclosed herein, therefore, node A has a module 100 that is coupled to link I–A, and a module 100 that is coupled to link A–E. Likewise, node G has a module 100 that is coupled to link H–G, and a module 100 that is coupled to link F–G. The modules 100 in node G handle the flow of traffic into node G over the primary and alternate paths, and the modules 100 in node A handle the flow of traffic into node A, also over the primary and alternate paths. Since the operations in both directions are identical, the following description focuses only on node G and the traffic that arrives from node A by going through the primary path as well as the traffic that arrives from node A by going through the secondary path.

Different modes of operation are possible for the FIG. 2 arrangement. One mode, for example, runs valid data through both the primary and the secondary paths, and controller 50 in node G decides whether the behavior of the primary path is sufficiently error free to continue directing element 200 of node G to use the data provided by link H–G and to ignore the data provided by link F–G. Another mode employs the secondary path for some other—lower priority—data. When the primary path is deemed to be poor, the lower priority traffic is preempted and the traffic that flowed through the primary path is caused to flow through the secondary path.

To realize this capability, controller 50 in node G includes the facility to control its associated element 200 so that a given traffic flow (for example, from link F–G) is ignored, or a different traffic flow is ignored (in a system that operates according to the first mode). This is easily achieved in element 200 in a conventional manner. The decision as to which traffic flow to accept is based, in accord with the principles disclosed herein, on evaluations of the error counts in the counters in module 100 that is coupled to the primary path's inbound link H–G, and the error counts of the counters in module 100 that is coupled to the secondary path's inbound link F–G. When the primary path's error rate is higher than a preselected threshold, and the secondary path's error rate is lower than another preselected threshold, controller 50 causes the secondary path to become the primary path. Of course, alarms may be raised in such a circumstance to alert administrators of the primary path's poor error rate performance.

Also in accord with the principles disclosed herein, controller 50 can poll the intermediate nodes of the paths under consideration, fore example, nodes I and H, to determine where the bulk of the errors are introduced, and to take possible remedial action. To illustrate, if the report from node H reveals that link I–H is responsible for the bulk of errors along the primary path, a system administration module can be initiated so that, while the secondary path serves as a temporary primary path, a new primary path is established that bypasses link I–H; for example, establishing a path consisting of link A–I, then link I–D, and then link D–G. Also a report to the entity that is responsible for maintaining the integrity of link I–H can be sent out.

It is noted that the signal output of line 11 is a sequence of codes, and that it is codes that are replaced when line 12 outputs a pulse to indicate that the code is invalid. It is possible, however, to have an embodiment where the unit of information of interest is a data block that consists of a number of codes, in which case it may be desired to replace an entire data block with the ER code whenever one or more of the codes in the data block are invalid. Error determination and the precise location of the error (in the block) depend on the method employed to ascertain the error. However, when the entire block is replaced with an ER code, the location of the error is unimportant, easing the need to merely detect the error or errors. Of course, if a data block is received with two invalid codes, one must decide whether to have the link error counter (30) increase by 1 or by two, and whether to have the received ER code counter (20) increase by 1 or by two, or by some other combination. A skilled artisan would have no difficulty in implementing whatever regimen is selected.

The above disclosed the principles of this invention with an illustrative embodiment, but it should be realized that various modifications could be incorporated without departing from the spirit and scope of this invention. To illustrate, the above-disclosed embodiments employ error monitoring at the terminal end of each link. Indeed, because of that, the error monitoring from one monitoring point to the next monitoring point is dubbed herein as link-level monitoring. However, monitoring can be carried out at any selected connection point within the network. Accordingly, in the context of this disclosure, the term link-level refers to the communication equipment between monitoring points. To give another example, counters 20 and 30 are read by controller 50 at a preselected rate, but embodiments can be envisioned where the counters evaluate an error rate, and trigger their own reporting to controller 50. To give still another embodiment, the circuitry within receiver element 10 that detects ER code signals at the input of element 10 and outputs corresponding pulses on line 13 can be made responsive to the output of multiplexer 40. In such an embodiment, the count within counter 20 provides the path error count.

What is claimed is:

1. Apparatus for monitoring transmission errors, comprising:

a detector, responsive to an input signal, for detecting an erroneous received data block;

a multiplexer for replacing said erroneous received input data block with a preselected error-reporting code; and a counting module for counting number of said erroneous received data blocks and received error-reporting codes.

2. The apparatus of claim 1 further comprising a network node with a signal routing module coupled to an ingress port of the network node, where said multiplexer is connected to said ingress port.

3. The apparatus of claim 1 where said counting module reports accumulated count of said erroneous received data blocks and said received error-reporting codes.

4. The apparatus of claim 3 where said report relating to count of said received error-reporting codes is reflected in a number that corresponds to a sum of said count of said erroneous received data blocks and said count of said received error-reporting codes.

5. The apparatus of claim 3 where said counting module is reset with each report to reflect a count of zero for both said erroneous received data blocks and said received error-reporting codes.

6. The apparatus of claim 5 where said reports are undertaken under control of a controller.

7. The apparatus of claim 6 where said controller maintains information received from said counting module.

8. The apparatus of claim 7 where said information is maintained in registers that represent different time intervals.

9. The apparatus of claim 6 where said controller is adapted for responding to polling that requests information about counts received from said counting modules.

10. The apparatus of claim 6 where said controller analyzes counts received from said counting module and outputs an alarm signal, or an directive signal, when a predetermined threshold is exceeded.

11. The apparatus of claim 1 where said input signal consists of PUGS codes and a selected error-reporting code that is a non-PUGS code.

12. The apparatus of claim 11 where said input signal employs 8b/10b/coding and said error-reporting code is the '/V/' code of said 8b/10b/coding.

13. The apparatus of claim 1 where said input signal is an Ethernet or Fiber channel signal.

14. A method for forwarding information about communication errors discovered in a node of a multi-node system, comprising the steps of:

detecting, in an input signal arriving from a link connected to said node, an erroneous received data block;

replacing said erroneous received input data block with a preselected error-reporting code;

forwarding said input signal, modified by having said erroneous received input data block replaced by said error-reporting code, to an egress link of said node;

counting number of said erroneous received data blocks and received error-reporting codes; and forwarding information generated through said step of counting.

15. The method of claim 14 where said step of forwarding forwards said information to an element that requests said information.

16. A method for monitoring communication errors comprising the steps of:

receiving data blocks of an incoming signal;

detecting data blocks obtained by said step of receiving that are erroneous;

replacing each erroneous data block identified by said step of detecting with an error-reporting code, thereby creating an augmented received signal;

counting number of said erroneous data blocks;

counting number of received data blocks that are error-reporting codes; and when triggered, reporting information generated in said step of counting.

17. The method of claim 16 further comprising a step of resetting to zero said count of said step of counting erroneous data blocks and said count of said step of counting received error-reporting codes following said step of reporting.

18. The method of claim 16 where said input signal consists of PUGS codes and a selected error-reporting code that is a non-PUGS code.

19. The method of claim 18 where said input signal is coded pursuant to an 8b/10b protocol.

20. The method of claim 19 where said error-reporting code is code '/V/' of said 8b/10b protocol.

21. The method of claim 18 where said input signal is an Ethernet or Fiber channel signal.

22. The method of claim 18 where said step of reporting reports to a controller, and further comprises the step of said controller storing counts of reports.

23. The method of claim 22 further comprising said controller analyzing information received through said step of reporting, to form analysis results.

24. The method of claim 23 where said controller outputs a message when said analysis results exceed a preselected threshold.

25. The method of claim 23 where said controller outputs said analysis results or said information received through said step of reporting.

26. A network that includes a plurality of transmission error monitoring points and transmission equipment therebetween, comprising:

at each of said monitoring points, a detector, responsive to an input signal, for detecting an erroneous received data block;

a multiplexer responsive to said detector for replacing said erroneous received input data block with a preselected error-reporting code; and a counting module responsive to said detector for counting number of said erroneous received data blocks and received error-reporting codes.

27. The network of claim 26 further comprising, at each of said monitoring points, a controller for obtaining counts from said counting module.

28. The network of claim 27 where said controller develops an output signal when a predetermined threshold is exceeded in said counts, which signal raises an alarm, or directs other equipment in said network to take action.

29. The network of claim 28 where said action is a rerouting of signals.

30. The network of claim 26 including links, and nodes between said links, where each of said nodes includes a number of said monitoring points, and said links form a part of said transmission equipment.

31. A method for operating a network with error monitoring points and transmission equipment that interconnects error-monitoring modules, comprising the steps of:

at each error monitoring module, receiving data block of an incoming signal;

detecting data blocks obtained by said step of receiving that are erroneous;

replacing each erroneous data block identified by said step of detecting with an error-reporting code, thereby creating an augmented received signal;

counting number of said erroneous data blocks;

counting number of received data blocks that are error-reporting codes; and when triggered, reporting count of said step of counting erroneous data blocks and count of said step of counting received error-reporting codes to a controller.

32. The method of claim 31 where said network carries a call from an originating node of said network, through a first plurality of links, to a terminating node of said network, said first plurality forming a primary path for said call, and said network also includes a secondary path between said originating node and said terminating node, through a second plurality of links that are substantially distinct from said first plurality of links, and where an error reporting module at said terminating node that is coupled to a link of said first plurality of links develops a signal, in response to said count received by its controller, directs switching said call from said primary path to said secondary path.

33. The method of claim 31 where said network carries a call from an originating node of said network, through a first plurality of links, to a terminating node of said network, said first plurality forming a primary path for said call, and said network also includes a secondary path between said originating node and said terminating node, through a second plurality of links that are substantially distinct from said first plurality of links, and where an error reporting module at any node that is coupled to a link of said first plurality of links develops a signal, in response to said count received by its controller, directs switching said call from said primary path to said secondary path.

34. A communication network comprising nodes, and links that interconnect said nodes, where receiving elements within each of said nodes are coupled to routing unit of said node and adapted to receive codes of a preselected coding schema that includes PUGS codes and non-PUGS codes, the improvement comprising:

at least some of said receiving elements include an error reporting module that includes:

a detector, responsive to an input signal of its respective receiving element, for detecting erroneous received data;

a multiplexer for replacing said erroneous received data with a preselected error-reporting code that is a non-PUGS code, resulting in an output signal that is transmitted to said routing unit; and a counting module for counting number of said erroneous received data blocks and received error-reporting codes.

35. The communication network of claim 34 further comprising circuitry, in each of said error reporting modules, for communicating information contained in said counting module, to a network administration element.

36. The communication network of claim 35 where said network administration element optimizes utilization of transmission capacity of said communication network.

37. The communication network of claim 36 where said optimization includes protection switching action by endpoint nodes of a communication employing a path that reports excessive errors.

* * * * *